United States Patent [19]

O'Brien, Jr.

[11] 4,163,463

[45] Aug. 7, 1979

[54] OXAZOLINE WAX IMPREGNATED SAUSAGE CASING

[75] Inventor: Merrill N. O'Brien, Jr., Danville, Ill.

[73] Assignee: Teepak, Inc., Chicago, Ill.

[21] Appl. No.: 959,396

[22] Filed: Nov. 9, 1978

Related U.S. Application Data

[62] Division of Ser. No. 538,636, Jan. 6, 1975.

[51] Int. Cl.$^2$ .......................... F16L 11/08; C08B 9/00
[52] U.S. Cl. .................. 138/118.1; 138/125; 426/105; 426/135; 426/138; 106/164
[58] Field of Search ............................... 106/164, 165; 138/118.1; 426/105, 135, 138

[56] References Cited

U.S. PATENT DOCUMENTS 3,956,539  11/1976  O'Brien ................................. 426/135

Primary Examiner—Theodore Morris
Attorney, Agent, or Firm—Paul Shapiro; J. E. Kerwin; C. E. Brown

[57] ABSTRACT

This invention relates to an artificial sausage casing and a process for making the casing. In making a regenerated cellulose casing an oxazoline wax is incorporated into viscose in a proportion from about 1–20% by weight of the cellulose content in the viscose, the oxazoline impregnated viscose extruded into a tubular casing, coagulated, and the cellulose regenerated. The casing has excellent handle, flexibility, and peelability from sausages processed therein.

6 Claims, No Drawings

OXAZOLINE WAX IMPREGNATED SAUSAGE CASING

This is a division of Ser. No. 538,636, filed Jan. 6, 1975.

BACKGROUND OF THE INVENTION

Artificial sausage casings made entirely of regenerated cellulose and fibrous casings have been widely used in the processing of frankfurters and salamis for a number of years. The basic process for the manufacture of small casings of regenerated cellulose is known as the viscose process and comprises extruding viscose, which is a solution of sodium cellulose xanthate in caustic soda, through an annular die to form a tubular casing, coagulating the casing in a coagulating bath, e.g., an acid-salt bath, and then subsequently regenerating the cellulose. After regeneration of the cellulose, the casing is plasticized, suitably with glycerin or other plasticizing agent, and dried to a moisture content of from about 8–10%. The casing coming from the dryer is wound on a reel. The casing then is shirred which comprises compacting substantial lengths of casing, e.g., 100–160 feet, into a few inches, e.g., 8–18 inches. After shirring, the casing is packaged.

In manufacturing fibrous casings, a paper web, usually manila hemp paper having a weight of from about 12–16 pounds per ream, is impregnated with viscose, coagulated, and the cellulose regenerated. The casing is plasticized, suitably with glycerin, and dried. The casing is sold to the meat processor in cut lengths of about 12–30 inches or in reel form or sometimes in shirred form as is done with the smaller regenerated cellulose casing.

Regenerated cellulose casing has a tendency to be brittle and often when flexed develops pinholes or cracks making it unsuited for stuffing with a meat emulsion. In the past, there has been a substantial loss of casing due to breakage of the casing at the shirring machine or substantial stuffing problems due to pinholes in the casing. Many commercial artificial casings also have a tendency to adhere to sausages and these sausage casings are difficult to peel from the sausage. In other words, these casings do not have "rapid peel" characteristics. By rapid peel characteristics it is meant that the casing can be readily peeled from the weiners by machine with very few peeling misses and with little scarring of the weiner.

DESCRIPTION OF THE PRIOR ART

It has been proposed to improve flexibility and peelability of artificial sausage casings by adding a variety of lubricants and moisture-providing liquids, such as a mixture of mineral oil and water, to the casing at the shirring machine to reduce breakage and pinholes. Generally, moisture is provided in an amount sufficient to bring the moisture content in the casing to about 18–20%. Plasticizing agents, e.g., glycerin, are added to the casing before drying so that the resultant casing will have a glycerin content of from about 15–20% by weight (moisture-free basis). Although humidification and plasticization of the casing improves flexibility of the casing, some problems are created. For example, regenerated cellulose loses strength with increasing moisture concentration and, therefore, the thickness of the casing must be adjusted to compensate for the reduced strength of the casing. Some moisture providing agents cause the casing to bind on the shirring mandrel resulting in lost production. Additionally, some lubricants do not have desired pleat lock characteristics for providing desired handle in the shirred casing and the shirred strand may break even with delicate handling.

Release agents, e.g., ketene dimers, water-soluble cellulose ethers in combination with mineral, vegetable, or animal oil or partial fatty acid esters of ethoxylated alcohols, e.g., Tween 80, have been added to the surface of the casing for improving peelability of the casing but these coating compositions do not have a significant remedial effect on reducing pinholes, breakage or strength.

SUMMARY OF THE INVENTION

This invention relates to an improvement in a process for preparing artificial sausage casings of regenerated cellulose including fibrous and non-reinforced and to the resulting casing. The basic process for producing sausage casings of regenerated cellulose comprises the steps of extruding viscose through an annular die to form a tubular casing, either reinforced or non-reinforced, and subsequently drying the casing. The improvement in the process comprises adding from about 1–20% of a water-dispersible oxazoline wax to the viscose based on the cellulose content in the viscose prior to extrusion.

The oxazoline wax suited for practicing the invention described herein is selected from the group represented by formulas 1 and 2 below:

FORMULA 1 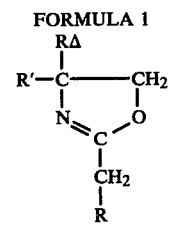   FORMULA 2 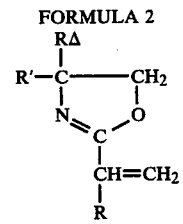

wherein R is a fatty acid radical having from 10–24 carbon atoms in the structure, R' is a methylol group, an alkyl group having from 1–10 carbon atoms in the structure, or a fatty acid ester radical

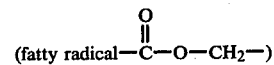

with the fatty radical portion having from 10–24 carbon atoms and not more than one unsaturated group, and R" is a methylol group, an alkyl group having from 1–20 carbon atoms, or a fatty acid ester radical,

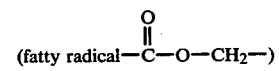

with the fatty radical portion having from 10–24 carbon atoms and not more than one unsaturated group. Usually from about 1–15% of the above oxazoline wax is embedded or impregnated in the casing, i.e., calculated on a dry cellulose basis.

The advantages of incorporating an oxazoline wax into viscose prior to extrusion and to the resulting casing having oxazoline wax embedded or impregnated therein include:

the ability to produce a casing which has excellent resistance to breaking and cracking, and other types of damage, particularly during the shirring process thereby resulting in greater yield of product;

the ability to produce a shirred casing which has outstanding physical characteristics in terms of "handle" and appearance;

the ability to produce a casing which does not require substantial humidification during the shirring cycle and yet has sufficient flexibility to undergo the shirring operation with substantially no damage or breakage;

the ability to produce a casing which is flexible and pliable even when exposed to ordinary atmospheric conditions for substantial periods of time;

the ability to produce casing having a lower moisture content, e.g., 10–15% by weight, than possible with non-treated casing, thereby producing a casing having increased strength over non-treated casing;

the ability to produce a casing having excellent peeling characteristics from sausages processed therein, even in the absence of conventional release agents commonly used for effecting peeling; and the ability to reduce the amount of plasticizing agent, e.g., glycerin, to about one-half of that ordinarily required in the manufacture of commercial casings of regenerated cellulose.

DESCRIPTION OF THE PREFERRED EMBODIMENTS

All of the advantageous features of the process and resulting casing are achieved by the incorporation of an oxazoline wax into the viscose prior to extrusion through an annular die to form the casing. The extrusion of viscose with the oxazoline wax incorporated therein produces a casing having the oxazoline wax embedded or incorporated therein.

Oxazoline waxes suited for practicing this invention typically are derived from aminohydroxy compounds which are in turn derived from nitroparaffins. Aminohydroxy compounds useful for making oxazoline esters are synthesized by reacting a nitroparaffin such as nitromethane, nitroethane, 1-nitropropane, or 2-nitropropane with formaldehyde and then reducing the nitro group with hydrogen to form the amine. Various levels of hydroxyl functionality can be introduced onto the aminohydroxy molecule by varying the amount of formaldehyde used in the reaction with the nitroparaffin. If active hydrogen atoms are present on the nitroparaffin molecule, then such hydrogen atoms can be reacted with formaldehyde and replaced with a methylol group. In the case of nitromethane, there are three active hydrogens on the molecule which can react with three moles of formaldehyde to form a trihydroxy nitroalcohol which then can be reduced with hydrogen to a trihydroxy amino alcohol.

Oxazoline compounds, and particularly oxazoline esters, are formed by reacting the amino alcohols with fatty acids. Two particular amino alcohols suited for forming oxazoline waxes useful in practicing this invention are: 2-amino-2-ethyl-1,3 propanediol and tris(hydroxymethyl)-aminomethane commonly referred to as Tris Amino. (Tris Amino is a trademark of Commercial Solvents Corporation.) These amino alcohols have all of the active hydrogen atoms replaced with free methylol groups which can be reacted with appropriate fatty acids to form desired oxazoline esters having wax-like properties.

Fatty acids suited for forming oxazoline waxes are those acids having from about 11–25 carbon atoms in the structure. Preferably these fatty acids are saturated but they can have up to one unsaturated group in the molecule without adverse effects. Fatty acids having more than one unsaturated group such as linoleic or linolenic acid can lead to the formation of a wax which is more susceptible to extraction from the casing. Extraction of the wax from the casing can lead to contamination of the meat and, therefore, such waxes are undesirable. Unsaturation of the acid also can lead to adverse results because of their capability of being able to react with contaminating materials in the processing of the casing through shirring and stuffing.

Although oxazoline compounds and esters thereof are conventionally formed by the reaction of the amino alcohol with a fatty acid, it is understood that fatty acid radicals can be introduced onto the molecule without using fatty acids per se. It is possible to use fatty acid anhydrides, fatty acid esters, or fatty acid halides, e.g., fatty acid chlorides, as opposed to the fatty acid for forming the oxazoline ester.

When the fatty acid radical has less than about 10 carbon atoms in the structure, the resulting oxazoline wax generally does not have the desired physical properties in terms of melting point or "waxiness" desired for the manufacture of artificial sausage casings. Oxazoline waxes made with low molecular weight fatty acids have a tendency to be soft or liquid at room temperature and are easily extracted from the casing. Such extraction can lead to contamination of the sausage processed therein. Oxazoline waxes made with acids having more than 25 carbon atoms in the structure quite often are difficult to disperse in water and afford no significant advantage in terms of the final casing product. Examples of fatty acids which can be employed for practicing the invention include: stearic, behenic, palmitic, oleic, lauric, and myristic. Typically, such acids are derived from vegetable oils. Vegetable oils can be used as a source of fatty acids for forming the oxazoline ester but one of the problems with using vegetable oils as the fatty acid source is that most oils contain a mixture of fatty acids, including unsaturated acids, which lead to a product having diverse physical properties as compared to a product made with substantially pure fatty acid.

The oxazoline wax used in practicing the invention should be a solid at room temperature (70° F.) and should be substantially water-insoluble (less than 0.1 g will dissolve in 100 cc water at 25° C.). The oxazoline waxes which employ a high molecular weight fatty acid and those which are completely esterified are substantially water-insoluble, and therefore, are preferred for the manufacture of artificial sausage casings. As might be expected, in those situations where free methylol groups are pendent from the molecule, hydrophilicity of the molecule is increased.

The oxazoline waxes contemplated for practicing this invention are capable of forming stable dispersions or emulsions in water. By that it is meant the waxes can be dispersed in water with emulsifying agents at a level of at least 150 g/liter by agitation. It is imperative that the oxazoline wax be able to form a stable aqueous dispersion so that they can be introduced into the viscose and extruded without agglomerating or settling. If the oxazoline wax agglomerates in the viscose, the wax cannot be uniformly distributed in the casing and non-uniform casing properties results.

In a preferred embodiment, the oxazoline wax is a diester of Tris Amino. The oxazoline diester preferably is made with saturated fatty acids having from about 16–19 carbon atoms with stearic acid being preferred.

The structure of the preferred oxazoline wax is:

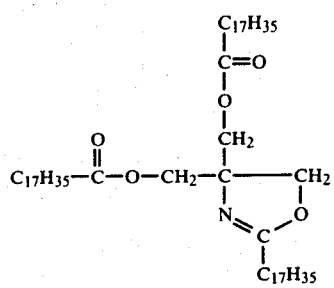

In manufacturing artificial sausage casings of the nonreinforced type, the oxazoline wax is added to the viscose in a proportion of from about 1–20% by weight of the viscose calculated on a cellulose content in the viscose. Preferably, the proportion of oxazoline wax is from about 3–10% by weight of the viscose. When less than about 1% oxazoline wax is added to the viscose, the casing does not have the desired physical characteristics, i.e., handle, shirrability, and peelability. In other words, there just is not enough oxazoline wax embedded or impregnated in the resulting casing to effectively accomplish the desired objectives. For example, there is some tendency for the casing to develop pinholes or other types of damage during the shirring operation as opposed to casings having slightly more oxazoline wax embedded or impregnated therein. When more than about 20% and sometimes about 15% oxazoline wax is incorporated into the viscose for the manufacture of non-reinforced artificial sausage casings, sometimes adverse results are obtained not so much because of pinholes and breakage, etc., but rather due to the fact that the wax imparts a weakness to the casing. At lower levels of oxazoline wax in the casing, strength of the casing is not a factor. Further, as the concentration of wax increases in the casing, it is more likely that some of the wax can be extracted and cause contamination of the meat.

In manufacturing fibrous casing (reinforced casing) a slightly higher concentration of wax in the casing (based on the cellulose content) is employed to enhance peelability than is required for non-reinforced cellulose casing. Generally, from about 6–15% oxazoline wax by weight of the casing (cellulose content) is used for reinforced casing to achieve enhanced peelability. Regenerated cellulose sausage casings of the non-reinforced type peel well with an oxazoline wax concentration in the range of from about 3–10% by weight (based on cellulose content). Lesser proportions of wax can be used for making both fibrous and non-reinforced casings for achieving good handle and shirrability; but, as the proportion of wax is reduced, often the peelability also is reduced. For these reasons, a proportion of from about 3–10% oxazoline wax is employed in preferred embodiments for making non-reinforced casing and from about 6–15% by weight for reinforced casing.

The oxazoline wax can be incorporated into the viscose in a number of ways. One of the better methods of incorporating the wax into the viscose is to first add the oxazoline wax to water in a proportion of from about 10–20% oxazoline wax and then agitating sufficiently, in the presence of an emulsifying agent, to form a stable aqueous dispersion. Often, it is necessary to heat the mixture to enhance dispersability of the wax.

Generally, it is useful to add emulsifying agents to the water to aid the dispersion of the oxazoline wax in water. Amino alcohols, used for forming the oxazoline wax, are excellent emulsifying agents and enable one to disperse the wax with substantially less energy than would be required if the wax were to be dispersed in the absence of such emulsifying agents. Exemplary of amino alcohol emulsifying agents which can be used for enhancing dispersion of the oxazoline wax include: aminomethyl propanol (AMP), aminoethyl propanediol (AEPD), and Tris Amino. Other emulsifying agents, e.g., fatty acid esters and ethoxylated fatty acid esters of sorbitan, can be used in addition to amino alcohols for enhancing dispersion of the oxazoline wax. Generally, from about 0.5–5% emulsifying agent will assist the dispersion of oxazoline wax in water.

It is preferred that the oxazoline wax be substantially uniformly dispersed in the water and the particles of the oxazoline wax have a diameter of from about 1–25 microns. The formation of dispersions having small diameter particles of oxazoline wax does essentially two things for casing manufacture. First, the dispersion is substantially more stable and can be dispersed into the viscose without agglomeration or settling. Second, the wax generally is uniformly absorbed or impregnated into the casing. Both factors are important in achieving uniform physical properties in the resulting casing. Although larger oxazoline wax particles can be used for manufacturing casing, the larger particles have a tendency to result in a casing product having irregularities in the casing surface.

The following examples are provided to illustrate preferred embodiments of the invention and are not intended to restrict the scope thereof. All percentages are expressed as weight percentages.

EXAMPLE 1

A dispersion of oxazoline wax sold under the label TS-970 by Commercial Solvents Corporation is dispersed in water as follows: (TS-970 is the reaction product of 1 mole Tris Amino condensed with 3 moles stearic acid).

| ITEM | GRAMS |
| --- | --- |
| Oxazoline Wax TS-970 | 78.76 |
| Span 60 | 10.81 |
| Tween 60 | 5.04 |
| 2-Amino-2-methyl-1-propanol(AMP) | 4.10 |
| Water | 492.30 |
| Alkaterge T (a water-insoluble cationic amine) | 5.96 |
| Fatty Acid-3 (a fatty acid sold by Arizona Chemical) | 2.94 |
| Total | 599.10g |

A 78.76 g portion of oxazoline wax, 6.71 g Span 60, and 3.17 g Tween 60 are heated to a temperature of about 100° C. Then, 4.1 g AMP are added to the heated mixture and blended. The resulting blend is added to 492.3 g water under a constant agitation. The temperature is maintained at about 100° C. A 4.1 g portion of Span 60, 1.87 g Tween 60, and 5.96 g Alkaterge T and 2.94 g fatty acid-3 are added to the water mixture for facilitating dispersion of the wax. After these latter components are added, the mixture is blended until a stable dispersion is formed. The particle size of the resulting wax is from about 1-25 microns in diameter with the major portion having a particle size of from about 10-20 microns.

A viscose having about a 7.7% cellulose content is prepared by a common commercial process and 2.9 parts of oxazoline wax dispersion is added to 100 parts of the viscose and blended therein for producing about a 5% concentration of oxazoline by weight of the cellulose in the viscose. The resulting viscose-oxazoline wax mixture is extruded through an annular die into a coagulating and regenerating bath for producing a non-reinforced tubular casing. The production of non-reinforced casing is done in accordance with well-known procedures.

The regenerated cellulose casing, then, is passed through a plasticizing bath containing from about 10-12% glycerin in water. The glycerin content in the cellulose casing is about one-half of that normally used for producing non-reinforced regenerated cellulose casing. The oxazoline wax, because of its plasticizing nature, eliminates the necessity of employing higher concentrations of glycerin. The casing then is dried and wound onto reels for shirring.

The casing is shirred on conventional shirring machines in conventional manner. In the shirring process, typically a lubricating agent comprising about 2% acetylated monoglyceride and 98% mineral oil is sprayed through the shirring mandrel onto the interior surface of the casing at a level of about 0.1% by weight of the casing. The purpose of this lubricant is to facilitate passage of the casing over the shirring mandrel. Sometimes, this lubricating agent is sprayed onto the external surface of the casing to reduce the wear of the shirring wheels. When the lubricant is applied as an external lubricant, it is applied at a level of about 1% by weight of the casing. Even though the oxazoline wax impregnated casing has self-lubricating properties, additional lubrication in the form of the lubricating agents above is preferred to reduce damage during shirring. As a result, very few problems are encountered during the shirring operation, in terms of casing damage and pinholes, as for example, approximately one strand per one-hundred strands shirred was deemed damaged or defective. This damage level is substantially below that of non-oxazoline wax impregnated casing. Non-oxazoline wax impregnated casing has a damage level of approximately 1.6 defects per 100 strands shirred. The resulting shirred casing having the oxazoline wax impregnated therein has excellent handle and a very smooth external surface. The casing when stuffed with a meat emulsion suited for manufacturing frankfurters, subjected to a cooking and smoking cycle, has excellent peelability from the frankfurters. Peelability is estimated to be at least equal to or superior to casings made and sold for their "Rapid Peel" characteristics.

The frankfurter meat is analyzed for wax contamination, i.e., the amount of wax extracted from the casing and absorbed by the frankfurter. The analytical tests show that less than 1 ppb (part per billion) wax is present in the frankfurter. These tests show that the oxazoline wax is firmly impregnated in the casing and is not extractable to any appreciable degree under the processing conditions employed in the manufacture of frankfurters.

EXAMPLE 2

Fibrous casings are made in accordance with accepted commercial techniques except that a dispersion of oxazoline was (TS-970) in water identical to that of Example 1 is added to the viscose. The level of oxazoline wax in the casing is varied as indicated in the table below with the lowest level being 0.5% and the highest level at 14%. The casings are 30 inches in length and about 11 inches in diameter. One set of the casings is stuffed with a boneless ham and sealed in the casings with a Tipper Tie press operating at approximately 80 psi. The hams are cooked for 12 hours to an internal temperature of 152° F. and then smoked.

The other set of fibrous casings are stuffed with a meat emulsion suited for making bologna. The meat is cooked to an internal temperature of 155° F. but are not smoked. The casings are evaluated for peelability from the ham and bologna processed therein and in terms of their handle and shirrability. Pinholes in the casings were essentially non-existent.

TABLE 1

| LEVEL TS-970 | PEELABILITY FROM HAM | PEELABILITY FROM BOLOGNA | HANDLE |
|---|---|---|---|
| 0.5 | Poor | Poor | Poor |
| 1.0 | Poor | Fair | Good |
| 2.0 | Poor | Fair | Good |
| 3.5 | Poor | Good | Good |
| 4.0 | Poor | Excellent | Good |
| 7.5 | Poor | Excellent | Good |
| 10% | Fair | Excellent | Fair |

The above table shows that the fibrous casings did not peel very well from hams at any of the wax concentration levels but peel excellently from bolognas when the concentration of oxazoline wax in the casing exceeded about 3½% and upwards to 14%. Apparently, the smoke cycle in the processing of ham interferes with the peelability of the casing but the cooking cycle in the processing of bologna does not interfer with peelability. In fact, peelability of the oxazoline wax impregnated fibrous casing from bologna is superior to the peelability of commercial "zip" casings. Zip casings typically have a ketene dimer coated on the inside of the casing.

I claim:

1. An artificial sausage casing of regenerated cellulose having impregnated therein from about 1-15% by weight of the cellulose in the casing of an oxazoline wax selected from the group consisting of:

FORMULA 1

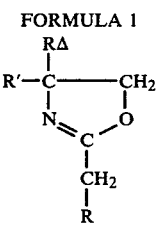

FORMULA 2

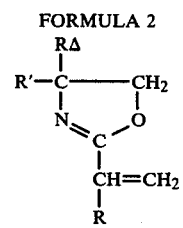

wherein R is a fatty acid radical having from 10-24 carbon atoms in the structure, R' is a methylol group, an alkyl group having from 1-10 carbon atoms in the structure, or a fatty acid ester radical

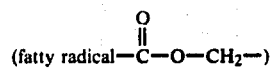

with the fatty radical portion having from 10–24 carbon atoms and not more than 1 unsaturated group and R″ is a methylol group, an alkyl group having from 1–20 carbon atoms, or a fatty acid ester radical

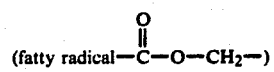

with the fatty radical portion having from 10–24 carbon atoms and not more than 1 unsaturated group.

2. The casing of claim 1 wherein R′ is an ester of a fatty acid.

3. The casing of claim 2 wherein R′ and R″ are saturated fatty acid ester radicals having from 16–19 carbon atoms.

4. The casing of claim 3 wherein R is a stearic acid radical and R′ and R″ are stearic acid ester radicals.

5. The casing of claim 3 wherein said casing is a non-reinforced casing having from 3–10% of said wax.

6. The casing of claim 4 wherein said casing is a fibrous casing having from 6–15% of said wax.

* * * * *